June 22, 1954     A. C. BLUE     2,681,792
UTILITY ATTACHMENT FOR SHOVELS
Filed Oct. 1, 1952

INVENTOR.
Albert C. Blue
BY
Merchant & Merchant
ATTORNEYS

Patented June 22, 1954

2,681,792

UNITED STATES PATENT OFFICE 2,681,792

UTILITY ATTACHMENT FOR SHOVELS

Albert C. Blue, Springfield, Minn.

Application October 1, 1952, Serial No. 312,563

1 Claim. (Cl. 254—131)

My invention provides a combination shovel and tire tool.

It is quite common for the driver of automotive vehicles to carry a shovel in his rear trunk or storage compartment for the purpose of digging out of snow and mud and for sprinkling sand on slippery road portions to increase traction. The object of my invention is the provision of simple and inexpensive means for converting a conventional shovel to a tool which can be utilized advantageously in applying and in removing a pneumatic tired wheel to an automobile or other wheeled vehicle and thus avoiding the dirt and the heavy lifting required where the tire is lifted onto the wheel or removed from the wheel by hand.

The above and still further objectives and advantages of my novel structure will become apparent from the following detailed specification, appended claims and attached drawings.

Referring the drawings wherein like characters indicate like parts through the several views.

Figure 1:
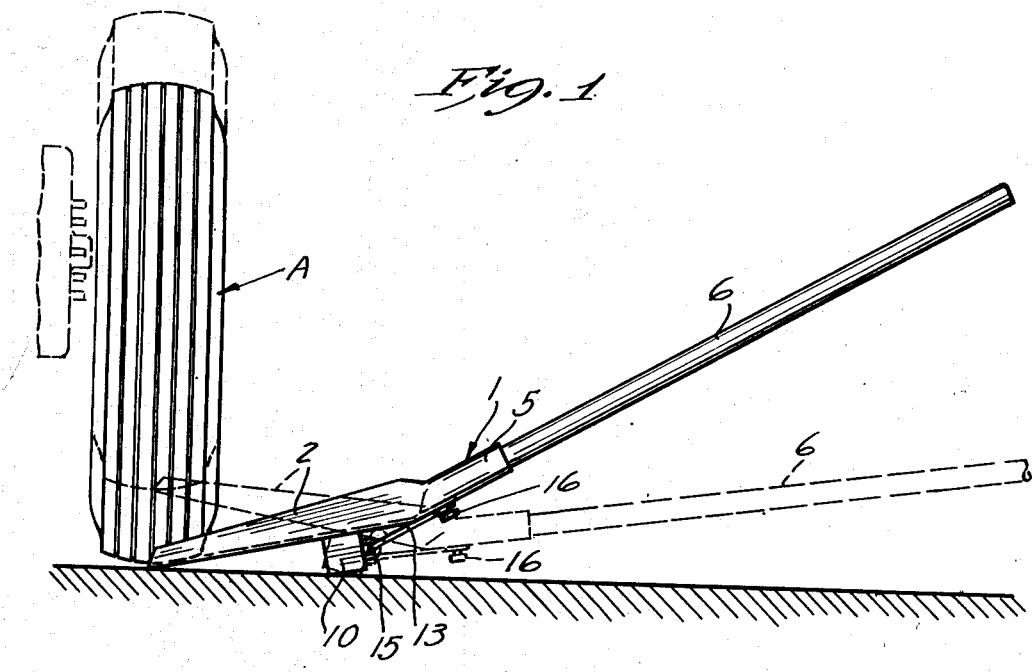
Fig. 1 is a view in side elevation of my novel structure illustrating the use thereof in elevating a pneumatic tire-equipped wheel for the purpose of placing the same on the conventional rotary wheel drum or element.
Figure 2:
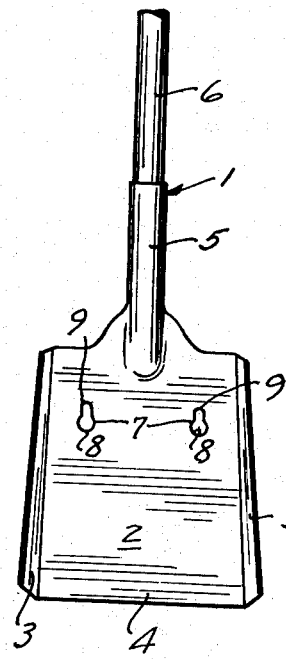
Fig. 2 is a view in top plan of the shovel portion of my novel device with the fulcrum member removed therefrom, some parts being broken away.
Figure 3:
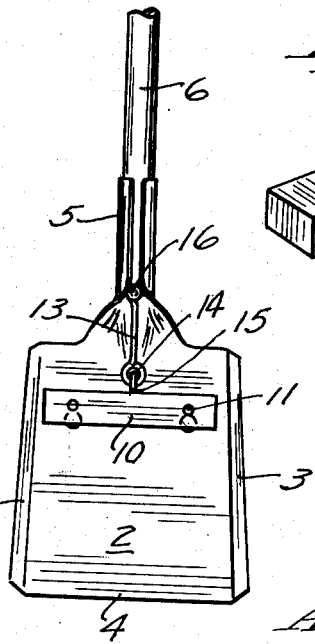
Fig. 3 is a view in bottom plan of the shovel portion of my novel device, some parts being broken away.
Figure 4:
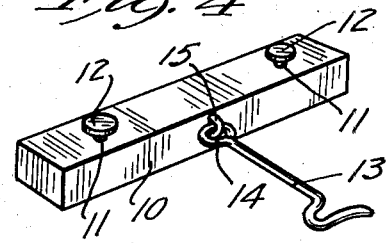
Fig. 4 is a view in perspective of the detachable fulcrum member of my novel structure.

Referring with greater particularity to the drawings, the numeral 1 indicates in its entirety a conventional shovel having a relatively flat scoop 2 formed from sheet metal or the like and having up-standing side flanges 3. The leading edge of the shovel is identified by the numeral 4, whereas the rear portion is formed into a tubular sleeve 5 to tightly receive the forward end of an elongated handle 6.

Preferably and as shown, the scoop 2 is provided with a pair of laterally-spaced longitudinally-extended openings 7 which are enlarged at their forward ends, as indicated at 8, and restricted at their rear ends, as indicated at 9. A bar-like fulcrum support 10 has a pair of lock-pins 11 projecting laterally from one side thereof—one each being adapted to register with one of said openings 7 in the scoop 2. It will be noted that the lock-pins 11 are provided with enlarged heads 12 capable of passing through the enlarged forward ends 8 of the openings 7 but incapable of passing through or being retracted from the restricted ends 9 thereof. An elongated hook element 13 has its looped rear end secured around an eye or hasp 15 in the side of the fulcrum support 10 in a plane intermediate the lock-pins 11. As shown in Fig. 1, the hook element 13 is adapted to detachably engage a headed anchoring lug 16 projecting laterally from the lower end of the handle 6.

The shovel 1 is of a size to be conveniently carried in the luggage compartment of an automotive vehicle, and it may be used as a shovel for sand, snow and the like as any other conventional shovel would be used—the apertures 8 not being of a size to materially affect this phase of its intended use and function. However, when it is desired to utilize the tool for the purpose of elevating the pneumatic tire-equipped wheel A, for the purpose of aligning the openings therein with the axle and the circumferentially-spaced screw-threaded bolts carried by the rotary wheel mounting drum, the headed locking-pins 11 are caused to pass through the enlarged portions 8 of the apertures 7 in the bottom of the scoop 2, and thereafter the fulcrum support 10 is pushed rearwardly so as to cause the locking-pins 11 to enter the reduced portions 9 of the openings 7. In this position the hook 13 is adapted to come into locking engagement with the anchoring lug 16 in the lower end of the handle 6. The assembled device is then positioned as shown in the full line position of Fig. 1, whereupon, by pushing downwardly upon the handle 6, the tire-equipped wheel A is elevated as desired around the fulcrum member 10, as shown by the dotted lines of Fig. 1.

My device has been thoroughly tested and found to be completely capable of the accomplishment of the objectives above set forth, and while I have disclosed a preferred embodiment thereof, it should be obvious that my invention is capable of modification without departure from the scope of the appended claim.

What I claim is:

In a device of the class described, a relatively flat scoop-like head having upstanding flanges at its opposite side edges, the rear portion of said body being bent to form a tubular sleeve, a handle rigidly secured within said sleeve and projecting rearwardly therefrom, said body being provided with a pair of laterally spaced longitudinally extended openings, said openings having enlarged forward ends and restricted rear ends, a bar-like fulcrum-acting support, a pair of locking-pins projecting laterally from said bar-like support and one each adapted to register with one of said openings in said body, said locking-pins having enlarged heads capable of passing through the enlarged forward ends of said openings but incapable of passing through the restricted rear ends thereof, and a hook element secured to said bar-like fulcrum-acting support in a plane intermediate said locking-pins and projecting rearwardly therefrom, said hook element adapted to detachably engage an anchoring lug projecting laterally from the lower end of said handle.

References Cited in the file of this patent

UNITED STATES PATENTS

| Number | Name | Date |
|---|---|---|
| 738,057 | O'Connor | Sept. 1, 1903 |

FOREIGN PATENTS

| Number | Country | Date |
|---|---|---|
| 320,796 | Great Britain | Oct. 24, 1929 |